(12) United States Patent
Singh et al.

(10) Patent No.: US 12,184,659 B2
(45) Date of Patent: *Dec. 31, 2024

(54) CREATING ROLES AND CONTROLLING ACCESS WITHIN A COMPUTER NETWORK

(71) Applicant: Juniper Networks, Inc., Sunnyvale, CA (US)

(72) Inventors: Gurminder Singh, Union City, CA (US); Pei-Yu Yang, Saratoga, CA (US); Rong Xie, Milpitas, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/047,727

(22) Filed: Oct. 19, 2022

(65) Prior Publication Data
US 2023/0061080 A1 Mar. 2, 2023

Related U.S. Application Data

(63) Continuation of application No. 16/235,739, filed on Dec. 28, 2018, now Pat. No. 11,516,220.

(51) Int. Cl.
*H04L 29/00* (2006.01)
*H04L 9/40* (2022.01)

(52) U.S. Cl.
CPC ........ *H04L 63/104* (2013.01); *H04L 63/0807* (2013.01); *H04L 63/105* (2013.01); *H04L 63/20* (2013.01)

(58) Field of Classification Search
CPC ..... H04L 63/08; H04L 63/0815; H04L 63/10; H04L 63/104; H04L 63/0807; H04L 63/105; H04L 63/20
See application file for complete search history.

(56) References Cited

U.S. PATENT DOCUMENTS 5,941,947 A 8/1999 Brown et al.
7,111,321 B1 9/2006 Watts et al.
(Continued)

FOREIGN PATENT DOCUMENTS

CN 104255007 A 12/2014
CN 108322472 7/2018
EP 3311548 B1 4/2019

OTHER PUBLICATIONS

Notice of Allowance from U.S. Appl. No. 17/305,179 dated Dec. 12, 2022, 12 pp.
(Continued)

*Primary Examiner* — Jeffrey C Pwu
*Assistant Examiner* — Helai Salehi
(74) *Attorney, Agent, or Firm* — Shumaker & Sieffert, P.A.

(57) ABSTRACT

This disclosure is directed to devices, systems, and techniques for enforcing access to resources within a computer network. In some examples, a system includes a network managed by a service provider and configured to provide a plurality of microservices to a plurality of tenants each having one or more users and a controller having access to the network. The controller is configured to output, to a user interface, data indicative of a plurality of capabilities for presentation by the user interface and receive, from the user interface, data indicative of a user selection of a set of capabilities and a user selection of a new role identifier. The controller is further configured to create, based on the set of capabilities and the role identifier, a role which enables access to a set of actions within a computer network, the set of actions corresponding to the set of capabilities.

16 Claims, 7 Drawing Sheets

(56) References Cited

U.S. PATENT DOCUMENTS

| | | | |
|---|---|---|---|
| 8,321,921 B1 * | 11/2012 | Ahmed | G06F 21/602 726/5 |
| 8,909,711 B1 | 12/2014 | Staddon et al. | |
| 8,935,757 B2 | 1/2015 | Srinivasan et al. | |
| 8,978,122 B1 | 3/2015 | Zolfonoon et al. | |
| 9,397,990 B1 | 7/2016 | Taly et al. | |
| 9,690,948 B2 | 6/2017 | Velasco | |
| 9,774,586 B1 * | 9/2017 | Roche | H04L 63/08 |
| 10,044,723 B1 * | 8/2018 | Fischer | H04L 63/102 |
| 10,078,762 B1 | 9/2018 | Gu et al. | |
| 10,142,349 B1 | 11/2018 | Tomlin | |
| 10,277,601 B1 | 4/2019 | Higgins et al. | |
| 10,380,369 B1 | 8/2019 | Noe et al. | |
| 10,382,202 B1 | 8/2019 | Ohsie et al. | |
| 10,666,657 B1 | 5/2020 | Threlkeld | |
| 11,012,495 B1 | 5/2021 | Vakalapudi et al. | |
| 11,070,540 B1 | 7/2021 | Singh et al. | |
| 11,516,220 B1 | 11/2022 | Singh et al. | |
| 11,516,254 B2 | 11/2022 | Singh et al. | |
| 2004/0064693 A1 | 4/2004 | Pabla et al. | |
| 2005/0044398 A1 | 2/2005 | Ballinger et al. | |
| 2005/0289348 A1 | 12/2005 | Joy et al. | |
| 2006/0069915 A1 | 3/2006 | Koeda | |
| 2006/0136309 A1 | 6/2006 | Horn et al. | |
| 2006/0235850 A1 | 10/2006 | Hazelwood et al. | |
| 2007/0244899 A1 | 10/2007 | Faitelson et al. | |
| 2010/0082979 A1 | 4/2010 | Edwards et al. | |
| 2010/0107213 A1 | 4/2010 | Ureche et al. | |
| 2011/0161423 A1 | 6/2011 | Pratt et al. | |
| 2011/0314520 A1 | 12/2011 | Olszewski et al. | |
| 2012/0311039 A1 | 12/2012 | Ogawa | |
| 2014/0047498 A1 | 2/2014 | Malegaonkar et al. | |
| 2014/0068732 A1 | 3/2014 | Hinton et al. | |
| 2014/0181939 A1 | 6/2014 | Bonnell | |
| 2014/0245389 A1 | 8/2014 | Oberheide et al. | |
| 2014/0267580 A1 | 9/2014 | Parent et al. | |
| 2014/0282849 A1 | 9/2014 | Collison et al. | |
| 2014/0359131 A1 | 12/2014 | Seed et al. | |
| 2015/0106736 A1 * | 4/2015 | Torman | G06F 16/907 715/745 |
| 2015/0215747 A1 | 7/2015 | Kemmerer et al. | |
| 2015/0296016 A1 | 10/2015 | Bennett, Jr. et al. | |
| 2015/0317463 A1 | 11/2015 | Herunde et al. | |
| 2016/0021179 A1 | 1/2016 | James et al. | |
| 2016/0044507 A1 | 2/2016 | Agiwal et al. | |
| 2016/0188440 A1 | 6/2016 | Bates et al. | |
| 2017/0123613 A1 | 5/2017 | Sugiyama | |
| 2017/0171208 A1 | 6/2017 | Purushothaman et al. | |
| 2017/0192767 A1 | 7/2017 | Choudhari et al. | |
| 2017/0262648 A1 | 9/2017 | Bhuiyan et al. | |
| 2017/0324694 A1 | 11/2017 | Islam | |
| 2017/0353483 A1 | 12/2017 | Weith et al. | |
| 2017/0359346 A1 | 12/2017 | Parab et al. | |
| 2018/0109688 A1 | 4/2018 | Uchibori et al. | |
| 2018/0176417 A1 | 6/2018 | Ando | |
| 2018/0211055 A1 | 7/2018 | Balijepalli et al. | |
| 2018/0268045 A1 | 9/2018 | Orman et al. | |
| 2018/0302392 A1 | 10/2018 | Gordon et al. | |
| 2018/0332141 A1 | 11/2018 | Brown et al. | |
| 2018/0375831 A1 | 12/2018 | Kliger et al. | |
| 2019/0005592 A1 | 1/2019 | Schlesinger | |
| 2019/0007415 A1 | 1/2019 | Kliger et al. | |
| 2019/0052644 A1 | 2/2019 | Shelton et al. | |
| 2019/0058734 A1 | 2/2019 | Xu et al. | |
| 2019/0073600 A1 | 3/2019 | Boshev et al. | |
| 2019/0104413 A1 | 4/2019 | Cidon et al. | |
| 2019/0109852 A1 | 4/2019 | Ranganathan et al. | |
| 2019/0114440 A1 | 4/2019 | Mani et al. | |
| 2019/0080698 A1 | 5/2019 | Miller | |
| 2019/0132299 A1 | 5/2019 | Tucker et al. | |
| 2019/0138658 A1 | 5/2019 | Mathur | |
| 2019/0171842 A1 | 6/2019 | Ritter et al. | |
| 2019/0188408 A1 | 6/2019 | Glik et al. | |
| 2019/0230127 A1 | 7/2019 | Gandham et al. | |
| 2019/0253430 A1 | 8/2019 | Gamache et al. | |
| 2019/0288839 A1 | 9/2019 | Lounsberry et al. | |
| 2019/0356697 A1 | 11/2019 | Chougule et al. | |
| 2019/0372845 A1 | 12/2019 | Tanaka et al. | |
| 2019/0386960 A1 | 12/2019 | Huang et al. | |
| 2020/0004442 A1 | 1/2020 | Caswell et al. | |
| 2020/0014751 A1 | 1/2020 | Laursen et al. | |
| 2020/0026873 A1 | 1/2020 | Jain et al. | |
| 2020/0073770 A1 | 3/2020 | Mortimore, Jr. et al. | |
| 2020/0097310 A1 | 3/2020 | Shukla et al. | |
| 2020/0106766 A1 | 4/2020 | Suraparaju et al. | |
| 2020/0120083 A1 | 4/2020 | Kaladgi et al. | |
| 2020/0134656 A1 | 4/2020 | Padmanabhan | |
| 2020/0137042 A1 | 4/2020 | Kannan, III et al. | |
| 2020/0167446 A1 | 5/2020 | Azulay et al. | |
| 2020/0184045 A1 | 6/2020 | Mills et al. | |
| 2020/0192651 A1 | 6/2020 | Mudumbai et al. | |
| 2020/0204384 A1 | 6/2020 | Esbensen et al. | |

OTHER PUBLICATIONS

Prosecution History from U.S. Appl. No. 16/235,647, dated Dec. 4, 2020 through Mar. 30, 2021, 49 pp.

Prosecution History from U.S. Appl. No. 16/235,739, dated May 26, 2021 through Sep. 8, 2022, 111 pp.

Prosecution History from U.S. Appl. No. 16/447,733, dated Jun. 15, 2021 through Oct. 26, 2022, 96 pp.

U.S. Appl. No. 17/305,179, filed Jul. 1, 2021, naming inventors Singh et al.

U.S. Appl. No. 18/057,057, filed Nov. 18, 2022, by Singh et al.

Notice of Allowance from U.S. Appl. No. 18/057,057 dated May 31, 2024, 12 pp.

Corrected Notice of Allowance from U.S. Appl. No. 18/057,057 dated Aug. 12, 2024, 2 pp.

Corrected Notice of Allowance from U.S. Appl. No. 18/057,057 dated Sep. 11, 2024, 2 pp.

* cited by examiner

CREATING ROLES AND CONTROLLING ACCESS WITHIN A COMPUTER NETWORK

This application is a continuation of U.S. patent application Ser. No. 16/235,739, filed Dec. 28, 2018, the contents of which are hereby incorporated by reference in their entirety.

TECHNICAL FIELD

The invention relates to computer networks and, more specifically, to controlling access within a computer network.

BACKGROUND

A computer network is a collection of interconnected computing devices that can exchange data and share resources. In a packet-based network, computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission. A computer network may have security policies which restrict a user's ability to perform actions within the computer network. In some examples, the computer network may require usernames and passwords to access the network, and the computer network may track and restrict access to some objects and services of the computer network based on the username or other login credentials of a user.

Keystone is a component of the OpenStackT™ open-source software platform for cloud computing. In general, Keystone is open-source software that enables authentication (authN) and high-level authorization (authZ) within a computer network. More specifically, Keystone supports token-based authN and user-service authorization. Keystone may track a specific user's actions within the computer network, and Keystone may additionally restrict the user's actions based on a "class" or "group" that the user is assigned to. Such a "class" or a "group" may be referred to as a "role." Additionally, a specific action or privilege of a user within the computer network may be referred to as a "capability."

Network service providers provide services such as linking customer sites through a network core (VPN services) or subscribers to a service, security, tunneling, virtual private networks, filtering, load-balancing, VoIP/Multimedia processing and various types of application proxies (HTTP, XML, WAP, etc.) to incoming packets. Service providers also provide content-specific services designed to improve the quality of a user's experience, for example, video streaming and caching. Service providers may administer a computer network, and service providers may use Keystone to control services available to each tenant of a plurality of tenants which interact with the computer network. In some cases, each tenant of the plurality of tenants may include one or more users of the computer network.

SUMMARY

In general, this disclosure is directed to devices, systems, and techniques for controlling access within a computer network. More specifically, this disclosure describes techniques for associating a plurality of users with a plurality of roles. The computer network in some cases may include a plurality of tenants, where each tenant of the plurality of tenants supports one or more users. For example, each user of the plurality of users may be assigned to one or more roles of the plurality of roles. The roles assigned to a user may determine services provided to the user, applications the user is permitted to access within the computer network, admin privileges the user has within the network, or any combination thereof. In some examples, a controller may be configured with a set of roles, where the set of roles are pre-defined in an open-source software program executed by the controller. The set of roles may enable the controller to customize network access for each user associated with the plurality of tenants. However, it may be beneficial for the controller to create additional roles as a supplement to the set of roles included with the open-source software program. At least one technique of this disclosure enables the creation of custom roles using a controller, the custom roles being associated with custom sets of actions or privileges (e.g., "capabilities") within the computer network.

In some examples, to create a custom role, a user interface may receive a user input from a service provider user, the user input representing a selection of a set of capabilities. The set of capabilities may be a subset of a plurality of capabilities displayed on the user interface for selection by the service provider user. Each capability of the plurality of capabilities may represent an action or a privilege within the computer network. In this way, the set of capabilities corresponding to the custom role may represent a set of actions and privileges available to a user that is assigned to the custom role after it is created by the controller. In addition to receiving an input which represents the selection of the set of capabilities, the user interface may also receive, from the service provider user, an entry of a role identifier associated with the set of capabilities. The user interface is configured to transmit the set of capabilities and the role identifier to the controller and the controller may save the custom role in a role database. Additionally, the controller is configured to receive a plurality of sets of capabilities each corresponding to a respective role identifier and the controller is configured to create a plurality of custom roles based on the plurality of sets of capabilities and the respective role identifiers.

The plurality of custom roles may, in some cases, be modified based on service provider user input to the user interface. For example, the user interface may be configured to display a list of the plurality of custom roles. Additionally, the user interface may be configured to display the set of capabilities associated with each custom role of the plurality of custom roles. In some examples, the user interface is configured to accept inputs which represent updates to the set of capabilities associated with each custom role of the set of custom roles, and subsequently send instructions to the controller reflecting the received inputs. The controller may save the updates to the role database.

The computer network may, in some cases, be administered by a service provider which supports service provider users. In some examples, the service provider offers a variety of services to users who are configured to access the computer network. In some cases, the users may be affiliated with customer organizations (e.g., tenants) which connect to the computer network. The controller is configured to associate each user with a role or a set of roles, in some cases, based on instructions that the controller receives from the user interface. In some examples, the controller is configured to associate users with any combination of roles stored in the role database of the controller. In this way, the controller is configured to associate the users with any combination of the set of roles included with the open-source software and the set of custom roles created based on input to the user interface. As such, the service provider users are configured to control the capabilities available to each user of the computer network.

The techniques of this disclosure may provide one or more advantages. For example, it may be beneficial to create custom roles to supplement the set of roles provided with the open-source software. The computer network administered by the service provider may provide a plurality of solutions to tenants, where each solution of the plurality of solutions includes a plurality of microservices. Each microservice may independently define object types, entities, remote procedure calls (RPCs) to modify objects, or any combination thereof. In this way, each microservice may, in some examples, expose many object types. To provide role-based access control (RBAC) in the computer network having the plurality of microservices, at least one custom role may be created by a service provider. The at least one custom role may be associated with combinations of capabilities that do not exist in the set of pre-defined roles. As such, custom roles may increase an amount of control that the service provider has with respect to users' access to the computer network. For example, the creation of custom roles may enable the service provider to customize information that each user can view on a respective tenant user interface portal. Additionally, the creation of custom roles may enable the service provider to customize information that each user can view via representational state transfer (REST) application programming interfaces (APIs).

Additionally, creating and modifying custom roles based on service provider user input may improve the service provider's ability to provide a subscription-based program having different levels of service offered. In some examples, the service provider may define custom roles that allow access to services of the computer network based on a subscription that a user pays. For example, the service provider may assign a first user a first custom role and a second user a second custom role. The second custom role may, in some cases provide the second user greater access to the computer network than the first custom role provides the first user if the second user subscribes to a higher level of service than the first user.

In some examples, a system includes a network managed by a service provider and configured to provide a plurality of microservices to a plurality of tenants each having one or more users and a controller having access to the network. The controller is configured to output, to a user interface, data indicative of a plurality of capabilities for presentation by the user interface, receive, from the user interface, data indicative of a user selection of a set of capabilities and a user selection of a new role identifier, where the set of capabilities includes one or more of the plurality of capabilities, and where the role identifier corresponds to the set of capabilities. The controller is further configured to create, based on the set of capabilities and the role identifier, a role which enables access to a set of actions within a computer network, the set of actions corresponding to the set of capabilities.

In other examples, a system includes a network managed by a service provider and configured to provide a plurality of microservices to a plurality of tenants each having one or more users, a user interface, and a controller having access to the network and configured for communication with the user interface. The controller is configured to output, to the user interface, data indicative of a plurality of capabilities for presentation by the user interface and receive, from the user interface, data indicative of a user selection of a set of capabilities and a user selection of a new role identifier, where the set of capabilities includes one or more of the plurality of capabilities, and where the role identifier corresponds to the set of capabilities. The controller is further configured to create, based on the set of capabilities and the role identifier, a role which enables access to a set of actions within a computer network, the set of actions corresponding to the set of capabilities.

In other examples, a method includes outputting, using a controller having access to a network managed by a service provider and configured to provide a plurality of microservices to a plurality of tenants each having one or more users, data indicative of a plurality of capabilities for presentation by a user interface, receiving, from the user interface, data indicative of a user selection of a set of capabilities and a user selection of a new role identifier, where the set of capabilities includes one or more of the plurality of capabilities, and where the role identifier corresponds to the set of capabilities, and creating, based on the set of capabilities and the role identifier, a role which enables access to a set of actions within a computer network, the set of actions corresponding to the set of capabilities.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
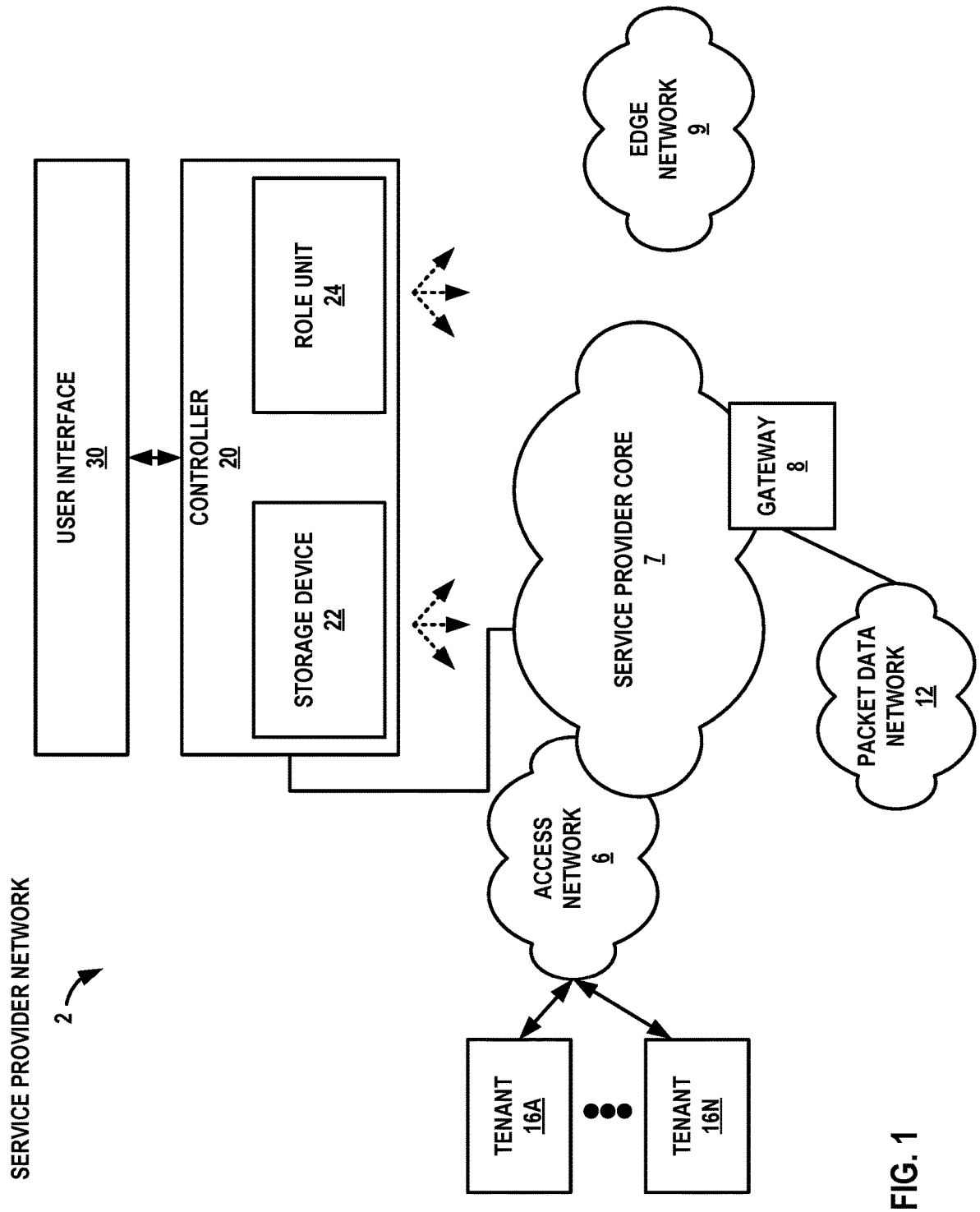
FIG. 1 illustrates an example network system in accordance with one or more techniques described herein.

FIG. 1 illustrates an example network system in accordance with one or more techniques described herein. The example network system of FIG. 1 includes a service provider network 2 that provides packet-based network services to tenants 16A-16N (collectively, "tenants 16"). In this way, service provider network 2 provides packet-based network services to "users" of tenants 16. That is, service provider network 2 provides authentication and establishment of network access for users of tenants 16 such that the tenant may begin exchanging data packets with packet data network (PDN) 12, which may represent an internal or external packet-based network such as the Internet. Although described with respect to a service provider operating a service provider network 2, service provider network 2 may in some examples represent an enterprise network managed by a large enterprise. Thus, references to a "service provider" or "provider" may similarly refer to an "enterprise manager," "network manager," or "operator." In addition, although described primarily with respect to "tenants" that connote end-users of service provider network services, the techniques described herein are similarly applicable to "customers" of the service provider and to customer devices such as cell towers, multi-tenant units (MTUs), residential aggregation points, and so forth. Examples of customers may include universities, businesses, or any other entities that purchase, lease, or otherwise use services provided by service provider network 2.

Role-based access control (RBAC) may, in some cases, be used as an approach to restrict and monitor user access within service provider network 2. For example, users of the computer network may each be assigned at least one "role." Roles may be associated with "permissions" which allow users to perform actions or view content, settings, materials, or other information. Permissions may, in some cases, be referred to a "capabilities."

Tenants 16 may include entities that use, access, or exchange data with service provider network 2. Each tenant of tenants 16 may be associated with one or more users. In turn, each user may represent, in some cases, a single device (e.g., mobile device, laptop, or tablet), and in other cases, a single user login account. Users of tenants 16 may have different levels of access within service provider network 2. Techniques of this disclosure may enable a service provider to customize the level of access available to each user by associating roles and capabilities with each user. Roles may be associated with one or more capabilities, and capabilities may represent specific privileges or allowed actions within service provider network 2. Each user of tenants 16 may be assigned to one or more roles. In this way, if a user is assigned to a role, the user may operate within service provider network 2 according to the capabilities that are associated with the role. Assigning roles to users of tenants 16 may enable the service provider to customize information that each user can view on a respective tenant user interface portal (not pictured). Additionally, the creation of custom roles may enable the service provider to customize information that each user of tenants 16 can view via representational state transfer (REST) application programming interfaces (APIs).

In some examples, a computer program may contain objects designed to interact with one another. In this way, the services provided by service provider network 2 may include a plurality of objects, where at least some objects are configured with an API enabling interactions with other objects of the plurality of objects. Some of the objects of service provider network 2 may include REST APIs that are RBAC controlled. As such, access to objects within service provider network 2 may be RBAC controlled. REST APIs may determine a user's access within service provider network 2. In some examples, RBAC may cause a navigation screen to be shown or to be hidden for a user based on capabilities that are associated with the user. In some examples, the REST APIs may be RBAC controlled such that a user has read-only access to a screen, but the user is not permitted to create objects on the screen. In some examples, since a user interface layout may change over time or the REST APIs needed to display a user interface screen may change, a dynamic mapping of user interface capabilities to REST APIs may be beneficial. Creating custom roles may enable service provider users which administer service provider network 2 to dynamically map capabilities to REST APIs for granting access to service provider network 2.

In some examples, service provider network 2 may include a network that serves a business. At least some of tenants 16 may represent business units within the business, each business unit having a one or more employees. Each employee, in some cases, may represent a user. If a junior accounting employee of an accounting business unit logs in to a respective tenant associated with the accounting business unit (e.g., tenant 16A), the junior accounting employee may access service provider network 2 according to rules, privileges, and restrictions associated with the junior accounting employee. The rules, privileges, and restrictions may be manifested in custom roles created by the service provider which operates service provider network 2. For example, the junior accounting employee may be able to access privileged financial documents that are restricted for viewing and editing the junior accounting employee. In some cases, a senior accounting employee associated with tenant 16A may be assigned to different roles and capabilities than the junior accounting employee, affording the senior accounting employee privileges that the junior accounting employee is not granted. Moreover, if a design employee of a product development business unit logs in to a respective tenant associated with the product development business unit (e.g., tenant 16B), the design employee may be able to access documents including confidential design diagrams of a not-yet-released product. The junior accounting employee and the senior accounting employee might not have access to the design diagrams, for example.

In other examples, service provider network 2 may be managed by a service provider which offers a subscription-based program to customers. In such examples, users of tenants 16 may be customers of service provider network 2. The service provider may define custom roles that allow access to services of the computer network based on capabilities contracted for by such a customer (e.g., based on a user's agreement to pay the service provider in for subscribed services). For example, the service provider may assign a first user a first custom role and a second user a second custom role. The second custom role may, in some cases provide the second user greater access to service provider network 2 than the first custom role provides the first user if the second user subscribes to a higher level of service than the first user. Alternatively, or in addition, the second custom role may, in some cases provide the second user with otherwise different access to or capabilities of service provider network 2 than the first custom role provides the first user if the second user subscribes to a different level of service than the first user.

In the example of FIG. 1, service provider network 2 includes access network 6 ("access network 6") that provides connectivity to PDN 12 and edge network 9 via service provider core network 7 and gateway 8. Service provider core network 7 and PDN 12 provide packet-based services that are available for request and use by tenants 16. As examples, core network 7 and/or PDN 12 may provide, for example, bulk data delivery, voice over Internet protocol (VoIP), Internet Protocol television (IPTV), Short Messaging Service (SMS), Wireless Application Protocol (WAP)

service, or customer-specific application services. Packet data network 12 may include, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various embodiments, PDN 12 is connected to a public WAN, the Internet, or to other networks. Packet data network 12 executes one or more packet data protocols (PDPs), such as IP (IPv4 and/or IPv6), X.25 or Point-to-Point Protocol (PPP), to enable packet-based transport of PDN 12 services.

Tenants 16 connect to gateway 8 via access network 6 to receive connectivity to subscriber services for applications hosted by tenants 16. In this way, access network 6 may include a tenant portal to service provider network 2 which allows tenants 16 to exchange information with service provider network 2 and display information for one or more users of tenants 16. A user of tenants 16 may be a subscriber who represents, for instance, an enterprise, a residential subscriber, or a mobile subscriber. Tenants 16 connect to access network 6 via access links that include wired and/or wireless communication links. The term "communication link," as used herein, includes any form of transport medium, wired or wireless, and can include intermediate nodes such as network devices. Each of access links may include, for instance, aspects of an asymmetric DSL network, WiMAX, a T-1 line, an Integrated Service Digital Network (ISDN), wired Ethernet, or a cellular radio link.

A network service provider operates, or in some cases leases, elements of access network 6 to provide packet transport between tenants 16 and gateway 8. Access network 6 represents a network that aggregates data traffic from one or more subscribers for transport to/from service provider core network 7 of the service provider. Access network 6 may include multiple "access" segments coupled to an aggregation segment and/or backhaul network owned or leased by the service provider. An access node of an access network couples to the customer premises equipment (CPE) to process subscriber packets at layer 2 (L2) or higher. Access nodes may include digital subscriber line access multiplexors (DSLAMs), MTUs, passive optical network (PON) optical line termination devices such as Reconfigurable Optical Add-Drop Multiplexer (ROADM) with microelectromechanical systems (MEMS) and Liquid Crystal on Silicon (LCOS), cell site gateways (CSGs), eNode Bs, LTE/GSM/UMTS controllers, and microwave as well as virtual Multiple-Input and Multiple-Output (MIMO) over distributed base stations. In the cable operator (Multiple System Operator (MSO)) domain, the Data Over Cable Service Interface Specification (DOCSIS) 3.x standards specify a means of channel bonding and dynamic frequency allocation. Broadband cable access network nodes may include Cable Modem Termination Systems (CMTS) and Cable Modems, e.g., as part of a Converged Cable Access Platform (CCAP) solution.

Access network 6 includes network nodes that execute communication protocols to transport control and user data to facilitate communication between tenants 16 and gateway 8. Access network 6 may include a broadband access network, network, a wireless LAN, a public switched telephone network (PSTN), or other type of access network, and may include or otherwise provide connectivity for cellular access networks, such as radio access network (RAN) 4 of FIG. 1. Examples of access network 6 may also include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

Transport nodes of the access network connect access nodes to border nodes that enable inter-region packet transport. Border nodes may include area border routers and autonomous system boundary routers (ASBRs). In the illustrated example, border nodes (not shown) couple access network 6 to core network 7.

Service provider core network 7 (hereinafter, "core network 7") offers packet-based connectivity to tenants 16 attached to access network 6 for accessing PDN 12. Core network 7 may represent a public network that is owned and operated by a service provider to interconnect a plurality of networks, which may include access network 6. Core network 7 may implement Multi-Protocol Label Switching (MPLS) forwarding and in such instances may be referred to as an MPLS network or MPLS backbone. In some instances, core network 7 represents a plurality of interconnected autonomous systems, such as the Internet, that offers services from one or more service providers. PDN 12 may represent an edge network coupled to core network 7, e.g., by a customer edge device such as customer edge switch or router. PDN 12 may include a data center.

Access network 6, core network 7, and edge network 9 may include service nodes that apply services to subscriber packets. Service node examples include L2 provider edge (PE) or L3 PE routers, broadband network gateway (BNGs), peering routers, content servers, media gateways, base station controllers, and so forth. Illustrated gateway 8 includes an example of a service node.

In examples of service provider network 2 that include a wireline/broadband access network, gateway 8 may represent a Broadband Network Gateway (BNG), a Broadband Remote Access Server (BRAS), MPLS Provider Edge (PE) router, core router, L2/L3 PE router, or gateway, for instance. In examples of service provider network 2 that include a cellular access network as access network 6, gateway 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to gateway 8 may be implemented in a switch, service card or other network element or component.

Service provider network 2 additionally includes, in this example, edge network 9. In some examples, edge network 9 may represent, e.g., a business edge network, broadband subscriber management edge network, mobile edge network, customer site such as enterprise branch offices, or a combination thereof. In some examples, edge network 9 may offer service provider managed network-hosted Value Added Services (VAS) including application-aware, and subscriber-aware services and charging, for instance. Access network 6 of FIG. 1 is also an example of an edge network for service provider network 2. Edge network 9 may alternatively represent a data center/value-added services complex that offers services by a computing environment including, e.g., a scalable cluster of general computing devices, such as x86 processor-based servers. As another example, the computing environment may include a combination of general purpose computing devices and special purpose appliances. Service provider core 7 may couple to multiple edge networks, such as any of the aforementioned examples of edge network 9.

As virtualized, individual network services provided by service nodes of the data center can scale through the allocation of virtualized memory, processor utilization, storage and network policies, as well as by adding additional load-balanced virtual machines. In one example, edge network 9 includes a data center that includes a set of interconnected, high-performance yet off-the-shelf packet-based routers and switches that implement industry standard protocols. In one example, edge network 9 includes a data center that includes off-the-shelf components that provide Internet Protocol (IP) over an Ethernet (IPoE) point-to-point connectivity.

A network service provider that administers at least parts of service provider network 2 typically offers services to subscribers associated with devices, e.g., users of tenants 16, which access the service provider network. Services offered may include, for example, traditional Internet access, VoIP, video and multimedia services, security services, and linking customer sites through the core network 7 using one of a point-to-point Ethernet service, multipoint-to-multipoint Ethernet service, point-to-multipoint Ethernet service, full-mesh L3VPN, and hub-and-spoke L3VPN, for instance. As described above with respect to access network 6, core network 7 may support multiple types of access network infrastructures that connect to service provider network access gateways to provide access to the offered services.

Controller 20, in one example, may include one or more processors that are configured to implement functionality and/or process instructions for execution within service provider network 2. Controller 20 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry. In the example illustrated in FIG. 1, controller 20 includes storage device 22 and role unit 24. Controller 20, based on data from user interface 30, may be configured to create a set of custom roles and assign the set of custom roles to users of tenants 16, thus controlling the access and privileges of the users within service provider network 2.

Storage device 22 may be configured to store information within controller 20 during operation. Storage device 22 may include a computer-readable storage medium or computer-readable storage device. In some examples, storage device 22 includes one or more of a short-term memory or a long-term memory. Storage device 22 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, storage device 22 are used to store program instructions for execution by controller 20. Storage device 22 may be used by software or applications running on controller 20 to temporarily store information during program execution.

Role unit 24 may, in some examples, manage the roles provisioned within service provider network 2. Role unit 24 may create a set of custom roles based an input to user interface 30, store roles in storage device 22, and assign roles to the users of tenants 16. Role unit 24 may include a set of pre-defined roles that, in some cases, may exist when role unit 24 is installed in controller 20. Role unit 24, based on the input to user interface 30, may associate any combination of the set of custom roles and the set of pre-defined roles with the users of tenants 16, thus controlling the access and privileges of the users within service provider network 2. In some examples, role unit 24 may modify any role of the set of pre-defined roles and the set of custom roles based on the input to user interface 30.

User interface 30 may be a device or set of devices for interacting with and/or managing interactions, input, and/or output with one or more service provider users. Accordingly, user interface 30 may include any now-known or hereinafter developed device for such interactions (e.g., keyboard, pointing device, microphone(s), touchscreen device(s), buttons, keypads, lights, microphone(s) and/or audio speaker(s) for voice commands, responses, and/or other interactions, display device(s), touchscreen device(s), or any combination thereof. If included within the user interface 30, a display may include any combination of a liquid crystal display (LCD), light-emitting diodes (LEDs), or organic light-emitting diodes (OLEDs). In some examples the display may include a touch screen or other physical or direct interaction device. User interface 30 may be configured to display any information related to roles, capabilities, tenants 16, or other information. The input may be, for example, in the form of pressing a button on a keypad or selecting an icon from a touch screen. In some examples, the input may include a selection of a set of capabilities and the selection of a role identifier associated with the selected set of capabilities. In these examples, controller 20 may, based on such input, create a custom role identified by the role identifier. User interface 30 may, in some cases, be electrically coupled to controller 20. Alternatively, or in addition, user interface 30 may wirelessly communicate with controller 20. In some cases, user interface 30 and controller 20 may be integrated into a single unit having a single housing.

User interface 30 may, in some examples, prompt a service provider user to login to service provider network 2. To login, the custom role may supply login credentials (e.g., username and password), provide biometric signals, provide voice signals, or any combination thereof. Service provider users of user interface 30 may include administrators of service provider network 2. As such, user interface 30 may function as an administrative portal to service provider network 2. After the service provider user logs in at user interface 30, user interface 30 may generate a token and user interface 30 may transmit the token to controller 20, the token indicating a set of roles assigned to the service provider user. The set of roles may include one or more roles (e.g., pre-defined roles, custom roles, or any combination thereof) that are assigned to the service provider user, each role of the set of roles being associated with at least one capability. Controller 20 is configured to receive the token. Role unit 24 may retrieve, from a data store, such as the role database of storage device 22, a group of capabilities associated with the set of roles. The group of capabilities may, in some cases, represent an exhaustive list of capabilities that the service provider user may use to create custom roles.

In order to enable a service provider user to create a custom role, controller 20 may be configured to output, to user interface 30, data indicative of a plurality of capabilities for presentation or display on user interface 30. For example, role unit 24 may retrieve the data indicative of the plurality of capabilities from storage device 22 and send the data indicative of the plurality of capabilities to user interface 30. In some examples, the data may be represented in the form of a human-readable data serialization language such as YAML (sometimes referred to as "YAML Ain't Markup Language") (YAML) or JavaScript Object Notation (JSON). As such, user interface 30 may be configured to parse data indicative of the plurality of capabilities and display the plurality of capabilities on a screen of user interface 30.

An example of the data indicative of the plurality of capabilities may include at least a portion of the following example YAML file:

```
ui-capabilities:
  - sp-capabilities:
    - Dashboard
    - Monitor
    - Resources:
      - PoPs
      - Devices
      - DeviceTemplates
      - Images
      - Configuration:
        - Network Services
        - Flex Services
        - name: ApplicationSLAProfiles
          actions:
            - R
      - Tenants
      - Administrations:
        - Users
        - Roles
        - Authentication
        - Licenses
        - SignatureDatabase
        - SMTP
  - tenant-capabilities:
    - Dashboard
    - Monitor
    - Resources:
      - Devices
      - Images
    - Configuration:
      - NetworkServices
      - Security:
        - NextGenFirewall:
          - name: FirewallPolicy
            extra-actions:
              - Deploy
              - Schedule
          - name: Schedule
        - NAT
        - UTM
      - Shared Objects:
        - Address
        - Department
        - Service
        - AppSignature
      - UnifiedThreatManagement
      - SSLProxy
    - Sites
    - Reports
    - Administrations:
      - Users
      - Roles
      - Licenses
      - SignatureDatabase- Certificates
implied-capabilities:
  - FirewallPolicy:R:
    - managePolicies
  - FirewallPolicy:C:
    - CreatePolicy
    - ModifyPolicy
    - DeletePolicy
  - FirewallPolicy:D:
    - DeletePolicy
  - FirewallPolicy:U:
    - ModifyPolicy
  - FirewallPolicy:Deploy:
    - PublishPolicy
    - UnPublishPolicy
  - Address:R:
    - shared-object:address:R
```

-continued

```
    - shared-object:get_address_by_uuids:C
  - Address:C:
    - shared-object:address:C,R,U,D
    - shared-object:get_address_by_uuids:C
  - AppSignature:R:
    - shared-object:application:R
  - AppSignature:C:
    - shared-object:application:C,R,U,D
  - Schedule:R:
    - sdManageScheduler
  - Roles:C:
    - iamsvc:role:C
    - iamsvc:get-capabilities-catalog:C
  - Roles:R:
    - iamsvc:role:R
    - iamsvc:get-capabilities-catalog:C
  - Roles:U:
    - iamsvc:role:U
    - iamsvc:get-capabilities-catalog:C
  - Roles:D:
    - iamsvc:role:D
    - iamsvc:get-capabilities-catalog:C
  - Sites:C:
    - tssm:create-sites:C
    - tssm:site:C,R,U
    - topology-service:site:C,R,U
    - job-service:create-job:C
    - job-service:job:C,R,U
    - job-service:task:C,R,U
    - job-service:add-task:C
    - ems-central:device-profile:R
ui-implied-capabilities:
  - FirewallPolicy:R:
    - Schedule:R:
    - Address:R
  - FirewallPolicy:C:
    - Scheduled
    - Address:R
```

The example YAML file may represent a capabilities catalog that is common throughout service provider network 2. In some examples, a capabilities catalog, such as that presented above, is used by all microservices within service provider network 2. As seen in the example YAML file, the plurality of capabilities may be arranged in a hierarchy. For example, the 'Configuration' capability under 'tenant-capabilities' may include the 'NetworkServices,' 'Security,' 'Shared Objects,' 'UnifiedThreadManagement,' and 'SSL-Proxy' capabilities. By the same token, the 'Shared Objects' capability includes the 'Address,' 'Department,' 'Service,' and 'AppSignature' capabilities. User interface 30 may parse the data to determine this hierarchy and display the plurality of capabilities to reflect the hierarchy reflected in the data indicative of the plurality of capabilities. In some examples, a screen of user interface 30 displays the plurality of capabilities in a menu such that a service provider user may elect to "hide" or "show" a subset of capabilities which depend from a higher-level capability. In this manner, user interface 30 may receive an input from the service provider user to collapse and expand the menu of the plurality of capabilities. Capabilities as described herein may, in some examples, also be referred to as "objects". In some examples, the 'sp-capabilities' of the example YAML file may be configured for display on the administrative portal represented by user interface 30, and the 'tenant-capabilities' may be configured for display on the tenant portals, which are accessible via tenants 16.

The example YAML file includes four actions: 'C' (create), 'R' (read), 'U' (update), and 'D' (delete). Others are possible. The 'implied-capabilities' and the 'ui-implied-capabilities' may represent implications of actions for the administrative portal (e.g., user interface 30) and the tenant portal, respectively. The administrative portal and the tenant portal may display the capabilities based on the example YAML file and overwrite the implied actions based on, in some examples, service provider user input. In some cases, the example YAML file includes REST APIs that are implied for a particular user interface screen (e.g., the administrative portal and/or the tenant portal).

In some examples, controller 20 may receive, from user interface 30, data indicative of a selection of a set of capabilities and a selection of a role identifier. In some such examples, user interface 30 may receive an input from a service provider user, the input indicating the set of capabilities selected by the service provider user. Additionally, the input received by user interface 30 may include the role identifier which is associated with the set of user-selected capabilities received by user interface 30. User interface 30, in some examples, may receive input representing a selection of any combination of the plurality of capabilities displayed by user interface 30. For example, user interface 30 may receive an input including a selection/deselection of a control which indicates whether the service provider user intends to include a respective capability of the menu of capabilities. In some examples, the control may include a checkbox, a button, or any other type of marker. User interface 30 is configured to send data indicative of the set of capabilities and the role identifier to controller 20. Role unit 24 of controller 20 may create, based on the set of user-selected capabilities and the user-selected role identifier, a custom role which enables access to a set of actions within service provider network 2, the set of actions corresponding to the set of capabilities. In some examples, the set of capabilities include network configuration capabilities, network security capabilities, network policy capabilities, object deployment capabilities, or any combination thereof. In other examples, the set of capabilities may include any capabilities of the set of capabilities.

In some examples, role unit 24 is configured to output data indicative of the custom role to a role database within storage device 22. The role database may include a group of roles including a set of pre-defined roles and a set of custom roles. The set of custom roles represent a user-created custom roles. Role unit 24 is configured to maintain the set of custom roles to reflect additions, deletions, and modifications to the set of custom roles based on inputs to user interface 30. In some examples, the group of roles stored by storage device 22 includes service provider roles, tenant roles, or any combination thereof. Tenant roles may be associated with users of tenants 16 and may define access and privileges of the users within service provider network 2. Service provider roles may be associated with service provider users (not illustrated in FIG. 1) which have administrative control over service provider network 2. The service provider users may create custom roles, assign custom roles, define security rules within service provider network 2, among other things.

Role unit 24 of controller 20 may be configured to receive, from user interface 30, instructions to associate a role of the group of roles stored in storage device 22 role with a user of tenants 16. Controller 20 may receive instructions to associate any one of a pre-defined role of the set of pre-defined roles or a custom role of the set of custom roles with the user. In some examples, controller 20 may associate more than one role of the group of roles with the user. In this way, role unit 24 may associate the role or group of roles with any user of tenants 16, enabling each user of tenants 16 to perform a set of actions associated with the capabilities corresponding to the respective roles.

Service provider network 2 may support a multi-level subscription program which uses roles and capabilities to define each level of the multi-level subscription program. For example, role unit 24 may create a first custom role and a second custom role based on inputs to user interface 30, the first custom role having a first role identifier and the second role having a second role identifier. Role unit 24 may create the first custom role based on a selection of a first set of capabilities and role unit 24 may create the second role based on a selection of a second set of capabilities. In some examples, the second set of capabilities represents a higher level of network service than the first set of capabilities. In other words, if a first user is associated with the first custom role and a second user is associated with the second custom role, the second user may be granted more access and privileges in service provider network 2 than the first user. For example, packet data network 12 may provide more services to the second user than packet data network 12 provides to the first user. Additionally, in some examples, the multi-level subscription program may include additional roles beyond the first custom role and the second custom role.

In addition to creating custom roles, controller 20 may also, in some cases, modify existing roles stored by storage device 22. In some examples, controller 20 is further configured to receive, from user interface 30, data indicative of a modification of the role. The data indicative of the modification may, in some cases, be coded in a human-readable data serialization language such as YAML or JSON. Controller 20 may modify the role based on the data indicative of the modification. To modify the role based on the data indicative of the modification, controller 20 is configured to add at least one capability to the set of capabilities associated with the role, remove at least one capability of the set of capabilities associated with the role, or any combination thereof. Additionally, role unit 24 is configured to output data indicative of the modification to the role database of storage unit 22.

Figure 2:
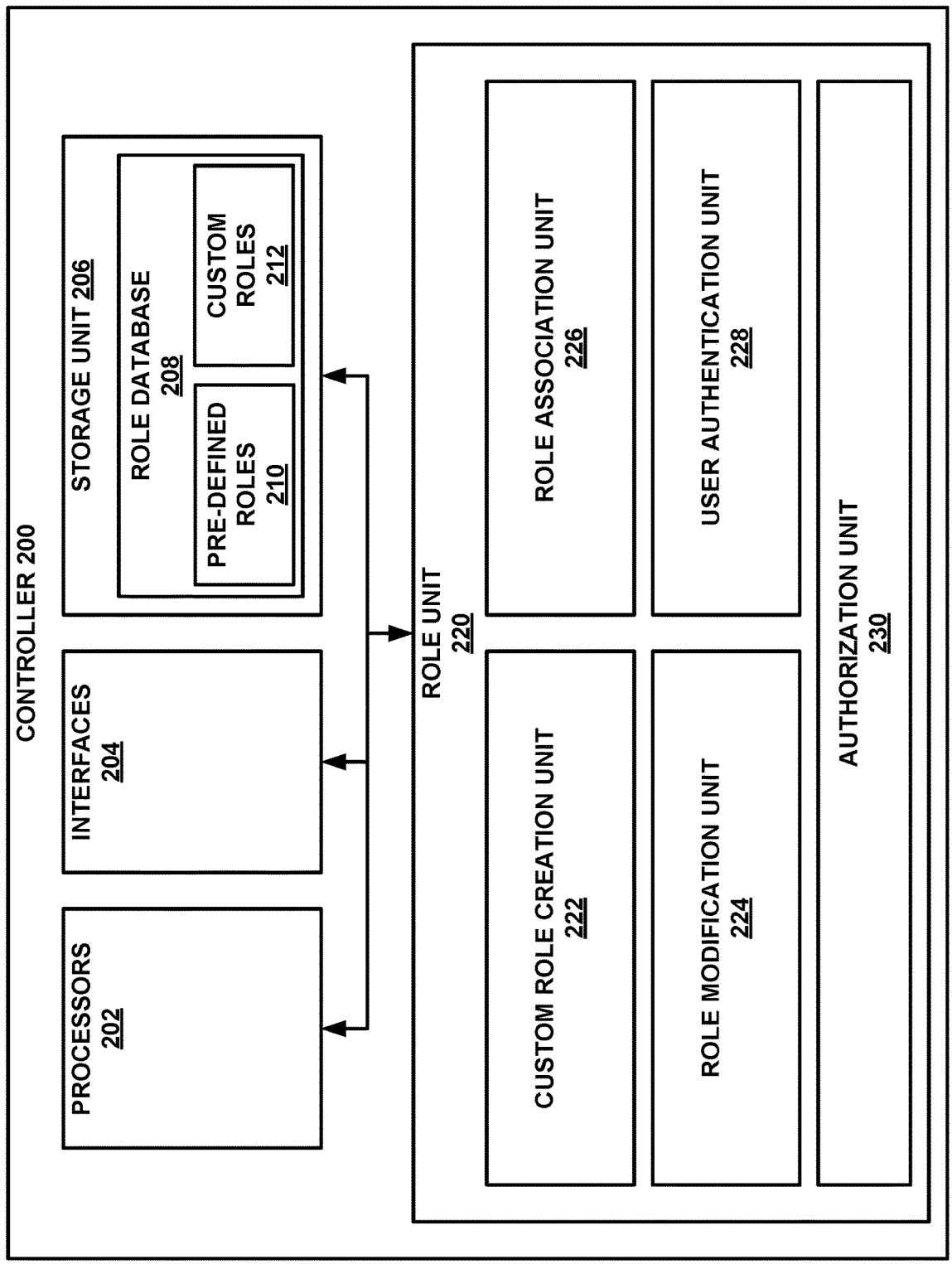
FIG. 2 is a block diagram illustrating an example controller, in accordance with one or more techniques described herein.

FIG. 2 is a block diagram illustrating an example controller 200, in accordance with one or more techniques described herein. Controller 200 of FIG. 2 may be described as an example or alternative implementation of controller 20 within service provider network 2 of FIG. 1. One or more aspects of controller 200 of FIG. 2 may be described within the context of service provider network 2 of FIG. 1. Controller 200 should not be limited to the illustrated example architecture. In other examples, controller 200 may be configured in a variety of ways.

In the example illustrated in FIG. 2, controller 200 includes role unit 220 which is configured to create custom roles and modify custom roles or pre-defined roles based on data indicative of inputs to user interface 30. For example, role unit 220 includes custom role creation unit 222 and role modification unit 224.

Controller 200 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, controller 200 represents a cloud computing system, server farm, and/or server cluster (or portion thereof) that provides services to client devices and other devices or systems. In other examples, controller 200 may represent or be implemented through one or more virtualized compute instances (e.g., virtual machines, containers) of a data center, cloud computing system, server farm, and/or server cluster.

As shown in the example of FIG. 2, controller 200 includes one or more processors 202, one or more interfaces 204, and storage unit 206. Storage unit 206 may include role database 208 which includes a set of pre-defined roles 210 and a set of custom roles 212. Storage unit 206 of controller 200 may also store an operating system (not shown) executable by processors 202 to control the operation of components of controller 200. The components, units or modules of controller 200 are coupled (physically, communicatively, and/or operatively) using communication channels for inter-component communications. In some examples, the communication channels may include a system bus, a network connection, an inter-process communication data structure, or any other method for communicating data.

Processors 202, in one example, may include one or more processors that are configured to implement functionality and/or process instructions for execution within controller 200. For example, processors 202 may be capable of processing instructions stored by storage unit 206. Processors 202 may include, for example, microprocessors, DSPs, ASICs, FPGAs, or equivalent discrete or integrated logic circuitry, or a combination of any of the foregoing devices or circuitry.

Controller 200 may utilize interfaces 204 to communicate with external systems via one or more networks, e.g., service provider network 2 of FIG. 1. Interfaces 204 may be network interfaces (such as Ethernet interfaces, optical transceivers, radio frequency (RF) transceivers, Wi-Fi or Bluetooth radios, or the like), telephony interfaces, or any other type of devices that can send and receive information. In some examples, controller 200 utilizes interfaces 204 to wirelessly communicate with external systems, e.g., tenants 16 and user interface 30 from FIG. 1.

Storage unit 206 may be configured to store information within controller 200 during operation. Storage unit 206 may include a computer-readable storage medium or computer-readable storage device. In some examples, storage unit 206 includes one or more of a short-term memory or a long-term memory. Storage unit 206 may include, for example, RAM, DRAM, SRAM, magnetic discs, optical discs, flash memories, or forms of EPROM or EEPROM. In some examples, storage unit 206 is used to store program instructions for execution by processors 202. Storage unit 206 may be used by software or applications running on controller 200 to temporarily store information during program execution.

Storage unit 206 may include role database 208. Additionally, role database 208 may include pre-defined roles 210 and custom roles 212. Pre-defined roles 210 may include a set of pre-defined roles that are were installed in role database 208 when role unit 220 was installed in controller 200. In some examples, pre-defined roles 210 are created as part of an open-source software, such as the Keystone component of the OpenStack™ software platform. Each of pre-defined roles 210 may be associated with a pre-defined set of capabilities. On the other hand, custom roles 212 may include a set of custom roles that are created by role unit 220 based on data indicative of user input to user interface 30 of FIG. 1. In some examples, each custom role of custom roles 212 is associated with a set of capabilities that is selected by a user via user interface 30. User interface 30 is configured to transmit data indicative of the selected capabilities to controller 200, and role unit 220 is configured to create the custom role and save the custom role to storage unit 206 as a part of custom roles 212.

Role unit 220, which includes custom role creation unit 222, role modification unit 224, and role association unit 226 is configured to manage access and privileges of users within service provider network 2, where the users are associated with tenants 16. In some examples, controller 200 is configured to output, to user interface 30 via interfaces 204, data indicative of a plurality of capabilities for display on user interface 30. A user, such as service provider user, may only be able to create custom roles that are associated with a subset of capabilities associated with roles that are associated with the service provider user. In other words, the service provider user might not be able to create a custom role that is associated with capabilities that are not associated with roles assigned to the service provider user which is creating the custom role. Such restriction of custom role creation may improve a quality of the security of service provider network 2, since a service provider user is prevented from assigning a level of access to service provider network to that the service provider user does not possess.

In some examples, controller 200 receives a token specifying at least one role, where the role is associated with a service provider user interacting with user interface 30. In some examples, a token may be a set of data that is represented in the form of a human-readable data serialization language such as YAML or JSON. User interface 30 may generate the token, where the token includes user-specific data such as roles assigned to the service provider user, capabilities associated with the service provider user, username, air IP address, or any combination thereof. User interface 30 may generate the token based on login credentials of the service provider user. Role unit 220 may retrieve, from role database 208, one or more capabilities associated with the one or more roles. After retrieving the capabilities, role unit 220 may output, via interfaces 204, information about the capabilities to user interface 30. In some examples, role unit 220 may output capabilities as the data indicative of the set of capabilities, where the data is represented in the form of a human-readable data serialization language such as YAML or JSON.

In some examples, custom role creation unit 222 is configured to receive, from user interface 30 via interfaces 204, data indicative of selection of a set of capabilities and a selection of a role identifier to be created. The set of capabilities may be a subset of the plurality of capabilities, where the plurality of capabilities represents the capabilities associated with the roles assigned to the service provider user. The role identifier may correspond to the set of capabilities. Custom role creation unit 222 may create, based on the set of capabilities and the role identifier, a new custom role which enables access to a set of actions within service provider network 2, the set of actions corresponding to the set of capabilities. After creating the custom role, custom role creation unit 222 is configured to store data indicative of the custom role in role database 208 within storage unit 206 as a part of custom roles 212.

Role modification unit 224 may modify, based on instructions received from user interface 30, any of pre-defined roles 210 or custom roles 212. For example, role modification unit 224 is configured to receive, from user interface 30, data indicative of a modification of a role. The data may include the role identifier of the role that is slated for modification. The data may, in some cases, be coded in a human-readable data serialization language such as YAML or JSON. After receiving the data, role modification unit 224 may modify the role based on the data. To modify the role based on the data, controller 20 is configured to add at least one capability to the set of capabilities associated with the role, remove at least one capability of the set of capabilities associated with the role, or any combination thereof. Additionally, role modification unit 224 is configured to save the role modification to role database 208 of storage unit 206.

Role association unit 226 may be configured to associate and disassociate any of pre-defined roles 210 and custom roles 212 from users of tenants 16, service provider administrators, other service provider users, or any combination thereof. In some examples, role association unit 226 associates and disassociates role based on instructions received from user interface 30 via interfaces 204. For example, role association unit 226 may associate a first custom role and a second custom role with a user, which enables the user to perform actions corresponding to the capabilities associated with the first custom role and the second custom role. At another time, role association unit 226 may disassociate the first custom role from the user, meaning that the first user is no longer able to perform the actions corresponding to the capabilities associated with the first custom role. As such, role association unit 226 is configured to control the access and privileges of the users of tenants 16, service provider administrators, and other service provider users within service provider network 2.

User authentication unit 228 may be configured to receive a token which indicates at least one role assigned to a service provider user. After receiving the token, user authentication unit 228 may be configured to retrieve capabilities associated with the role assigned to the service provider user from role database 208. In the example described, role database 208 includes pre-defined roles 210 and custom roles 212, and data indicative of capabilities that are associated with each of pre-defined roles 210 and custom roles 212. In this manner, based on the role identifiers included with the token, user authentication unit 228 may look-up the capabilities associated with the roles given by the role identifiers. User authentication unit 228 may output the token along with the capabilities associated with the roles assigned to the service provider user. The capabilities may represent a plurality of capabilities that may be presented or displayed on a screen, such as a screen associated with input interfaces 306 or a tenant portal of tenants 16. Since capabilities may correspond to actions and privileges within service provider network 2, the plurality of capabilities may represent an exhaustive list of the actions and privileges available to the service provider user within service provider network 2.

In some examples, authorization unit 230 is configured to grant or deny access to objects or remote procedure calls (RPCs) based on roles and capabilities assigned to a user (e.g., a user of tenants 16 or a service provider user). Authorization unit 230 may receive a request including a request header. In some examples, the request header includes a hierarchy of roles and capabilities corresponding to the user. Additionally, in some examples, the request includes information indicative of the user's intent to access one or more objects or RPCs within service provider network 2. Authorization unit 230, in addition to validating the roles from the request header, validates whether the user may access the one or more objects or RPCs based on whether a respective capability exists in the request header. In this way, authorization unit 230 provides granular authorization of users within service provider network 2 by granting and denying access to specific objects and RPCs based on the assignment of roles and respective capabilities to the user, and the association of capabilities with the roles assigned to the user.

Figure 3:
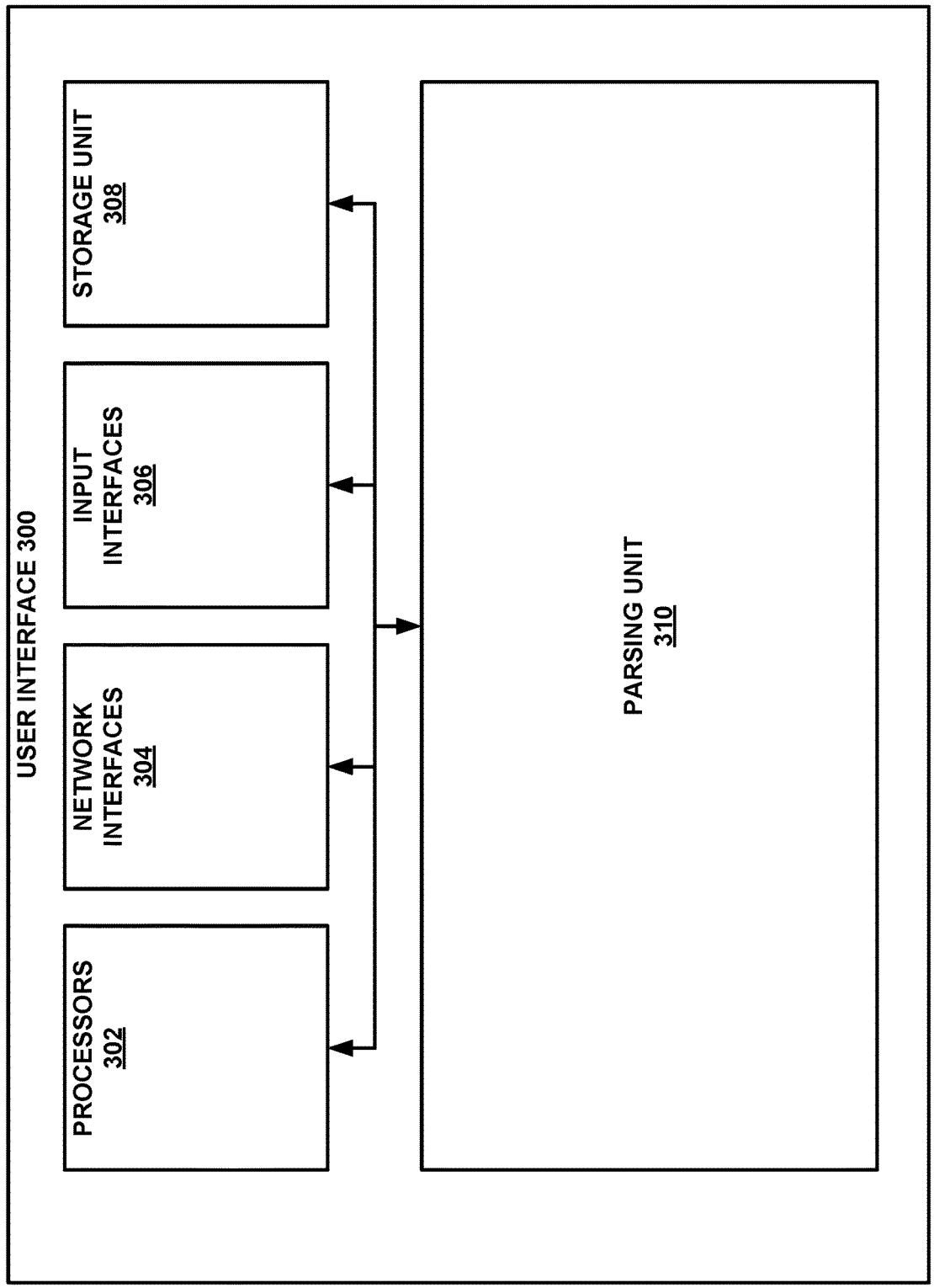
FIG. 3 is a block diagram illustrating an example user interface, in accordance with one or more techniques described herein.

FIG. 3 is a block diagram illustrating an example user interface 300, in accordance with one or more techniques described herein. User interface 300 of FIG. 3 may be described as an example or alternative implementation of user interface 30 within service provider network 2 of FIG. 1. One or more aspects of user interface 30 of FIG. 3 may be described within the context of service provider network 2 of FIG. 1. The architecture of user interface 300 illustrated in FIG. 3 is shown as an example. User interface 300 should not be limited to the illustrated example architecture. In other examples, user interface 300 may be configured in a variety of ways. User interface 300 may include processors 302, network interfaces 304, input interfaces 306, and storage unit 308. In some examples, user interface 300 may be implemented through a computing device, such as a laptop computer, desktop computer, smartphone, or tablet.

Processors 302, in one example, may include one or more processors that are configured to implement functionality and/or process instructions for execution within user interface 300. For example, processors 302 may be capable of processing instructions stored by storage unit 308. Processors 302 may include, for example, microprocessors, DSPs, ASICs, FPGAs, or equivalent discrete or integrated logic circuitry, or a combination of any of the foregoing devices or circuitry.

User interface 300 may utilize network interfaces 304 to communicate with external systems via one or more networks, e.g., service provider network 2 of FIG. 1. Network interfaces 304 may include Ethernet interfaces, optical transceivers, radio frequency (RF) transceivers, Wi-Fi, Bluetooth radios, telephony interfaces, or any combination thereof. In some examples, user interface 300 utilizes network interfaces 304 to wirelessly communicate with external systems, e.g., controller 20 from FIG. 1.

Input interfaces 306 may include a button or keypad, lights, a speaker for voice commands, a display, or any combination thereof. The display may include any combination of an LCD, LEDs, or OLEDs. In some examples, input interfaces 306 may detect input that corresponds to a user's (e.g., a service provider user) selection of a set of capabilities from a plurality of capabilities, the plurality of capabilities displayed on a screen associated with or included within input interfaces 306. In other examples, input interfaces 306 may receive, via a user input, an entry of a role identifier, the role identifier associated with the set of capabilities. In some examples, based on the user selections of the set of capabilities and the role identifier using input interfaces 306, controller 20 may create a custom role. In some examples, input interfaces 306 may display a list of roles, where the list of roles includes a set of custom roles and a set of pre-defined roles. Input interfaces 306 may detect input from a user and based on the input, associate roles of the list of roles with users of tenants 16. In this way, controller 200 may control access and privileges of users within service provider network 2 based on inputs received by user interface 300.

Storage unit 308 may be configured to store information within user interface 300 during operation. Storage unit 308 may include a computer-readable storage medium or computer-readable storage device. In some examples, storage unit 308 includes one or more of a short-term memory or a long-term memory. Storage unit 308 may include, for example, RAM, DRAM, SRAM, magnetic discs, optical discs, flash memories, or forms of EPROM or EEPROM. In some examples, storage unit 308 is used to store program instructions for execution by processors 302. Storage unit 308 may be used by software or applications running on user interface 300 to temporarily store information during program execution.

User interface 300 may use parsing unit 310 to determine one or more hierarchies of data for display on the screen of input interfaces 306. For example, user interface 300 may receive, from controller 20 via network interfaces 304, data indicative of a plurality of capabilities. The data may, in some cases, be coded in a human-readable data serialization language such as YAML or JSON. Additionally, in some cases the data may indicate a hierarchy within the plurality of capabilities, such that some capabilities may 'depend' from other capabilities. In this manner, the capabilities may form a 'tree' hierarchy. To determine the hierarchy of the plurality of capabilities, parsing unit 310 may parse the data indicative of the plurality of capabilities such that the data may be analyzed by processors 302, displayed by input interfaces 306, or any combination thereof.

Parsing unit 310 may employ linguistic parsing techniques. In other words, parsing unit 310 may take the data indicative of the plurality of capabilities and build a data structure. The data structure may include at least one of a parse tree, an abstract syntax tree, a flowchart, or another visual representation. As such, input interfaces 306 is configured to visually represent the plurality of capabilities on the screen, receive a user selection from the plurality of capabilities, and enable the user to view the plurality of capabilities in the 'tree' format with some capabilities depending from other capabilities. For example, user interface 300 may receive a user input including the selection of a control associated with a capability that has a group of depending capabilities, causing input interfaces 306 to 'show' or 'hide' the group of depending capabilities. In other examples, parsing unit 310 may parse other types of data for display on input interfaces 306. Such other types of data may include a list of roles, a list of tenants, network security rules, network configuration options, or any combination thereof.

In some examples, parsing unit 310 may prepare data coded in a human-readable data serialization language such as YAML or JSON to send to controller 20. For example, parsing unit 310 may prepare data indicative of a user selection of the set of capabilities and output the data to controller 20 via network interfaces 304. In other examples, parsing unit 310 may prepare other types of data for transmission to controller 20. Such other types of data may include a list of roles, a list of tenants, network security rules, network configuration options, or any combination thereof.

Figure 4:
FIG. 4 is an example user interface illustrating a selection of objects to create a custom role, in accordance with one or more techniques described herein.

FIG. 4 is an example user interface 400 illustrating a selection of objects to create a custom role, in accordance with one or more techniques described herein. User interface 400 may, in some examples, be an example of (or a visual, user-facing, representation of) input interface 306 of FIG. 3. User interface 400 includes role identifier box 410, role description box 420, role type box 430, and role permissions menu 440.

FIG. 4 illustrates an example screen layout that may be visible while user interface 400 is receiving a user input to create a custom role. For example, a computing device presenting user interface 400 may receive an input indicative of a role identifier in role identifier box 410. As such, "TenantAdmin-Policy Manager" may represent the role identifier associated with the custom role created by controller 20 based on the user input received by user interface 400 in the example of FIG. 4. Role description box 420 may receive an entry from a user (e.g., a service provider user) representing a description of the custom role created based on the user input. For example, the input to role description box 420 given by "Policy Manager" may indicate that the custom role will grant users assigned the custom role an ability to set, change, or otherwise control network policy. Role type box 430 may, in some cases, indicate a type of user that the custom role may be intended to be assigned to. For example, a "Tenant" custom role may be assigned to any user of tenants 16 and a "Service Provider" custom role may be assigned to a service provider user.

Role permissions menu 440 may display a hierarchy of objects, and user interface 400 may receive user input which represents a selection of a custom combination of the hierarchy of objects. As seen in the example of FIG. 4, some objects appear in sub-lists which are dependent on other objects. For example, the "Security" and "SD-WAN" objects are dependent on the "configuration" object. Moreover, the "Next Gen Firewall Policy," "network address translation (NAT) Policy," and "unified threat management (UTM) Policy" objects are dependent on the "Security" object. In some examples, the objects of role permissions menu 440 may represent capabilities to be associated with a custom role based on user input. After user interface 400 receives the user input representing the selection of capabilities, controller 20 may receive data indicative of the selection of capabilities and controller 20 may create a custom role based on the selection of capabilities.

Figure 5:
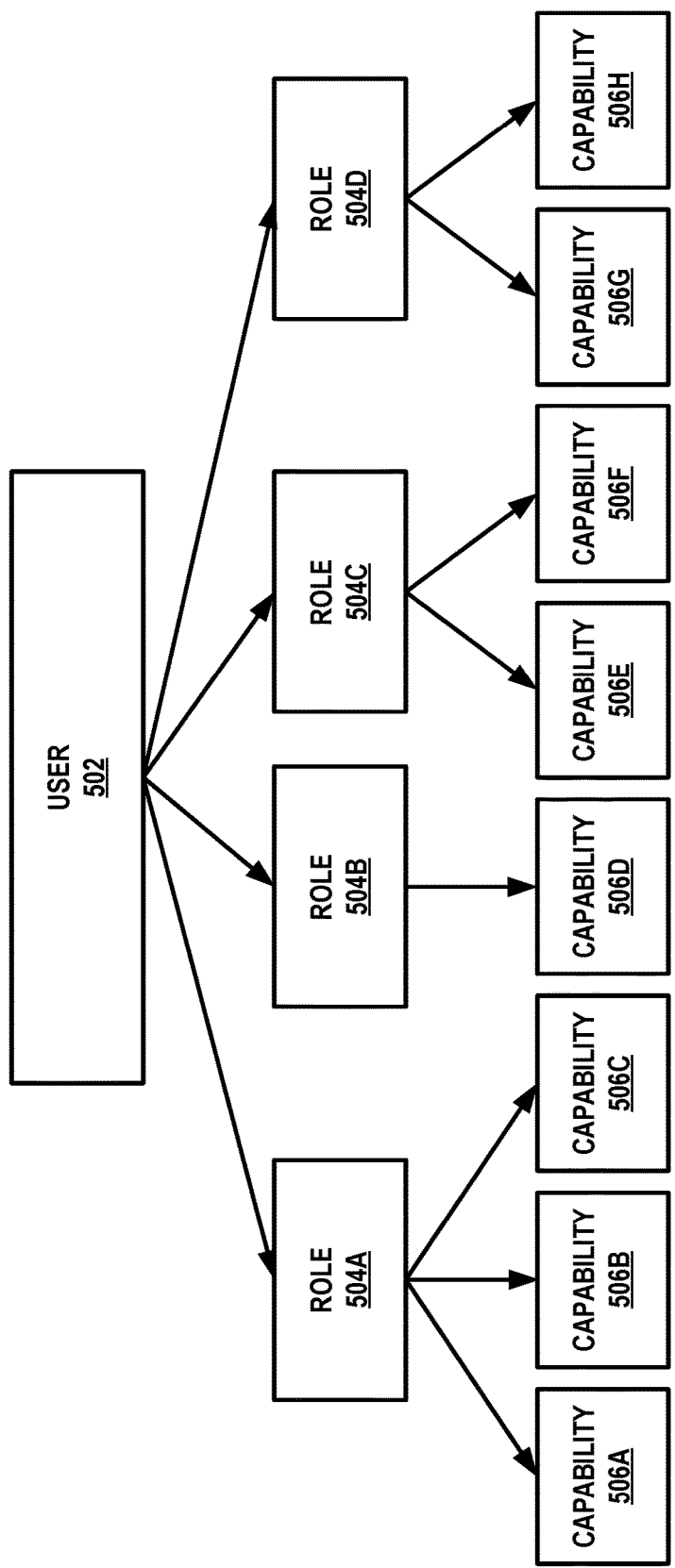
FIG. 5 is a block diagram illustrating roles and capabilities associated with an example user, in accordance with one or more techniques described herein.

FIG. 5 is a block diagram illustrating roles and capabilities associated with an example user 502, in accordance with one or more techniques described herein. User 502, in some examples, represents a user of tenants 16 in service provider network 2 of FIG. 1. In other examples, user 502 may represent a service provider user, where user interface 30 and controller 20 are configured to accept input from the service provider user to create custom roles and modify existing roles. In some examples, user 502 may be represented by a device, such as a smartphone, a laptop, a tablet, a processor, or another computing device. However, user 502 might not be limited to a single device or a group of devices. In some examples, user 502 may be represented by a user login account. For example, a user may verify an identity by providing a username and password, and thus provide authentication as user 502.

User 502 is assigned to roles 504A-504D (collectively, "roles 504"). Each role of roles 504 is associated with at least one of capabilities 506A-506H (collectively, "capabilities 506"). In the example of FIG. 5, role 504A is associated with capability 506A, capability 506B, and capability 506C. Role 504B is associated with capability 506D. Role 504C is associated with capability 506E and 506F, and role 504D is associated with capability 506G and capability 506H. In some examples, each of capabilities 506 correspond to an action or a privilege within service provider network 2 of FIG. 1. In this manner, the access and privileges that user 502 enjoys within service provider network 2 are at least in part predicated on the roles 504, and by extension the capabilities 506 that correspond to user 502.

Figure 6:
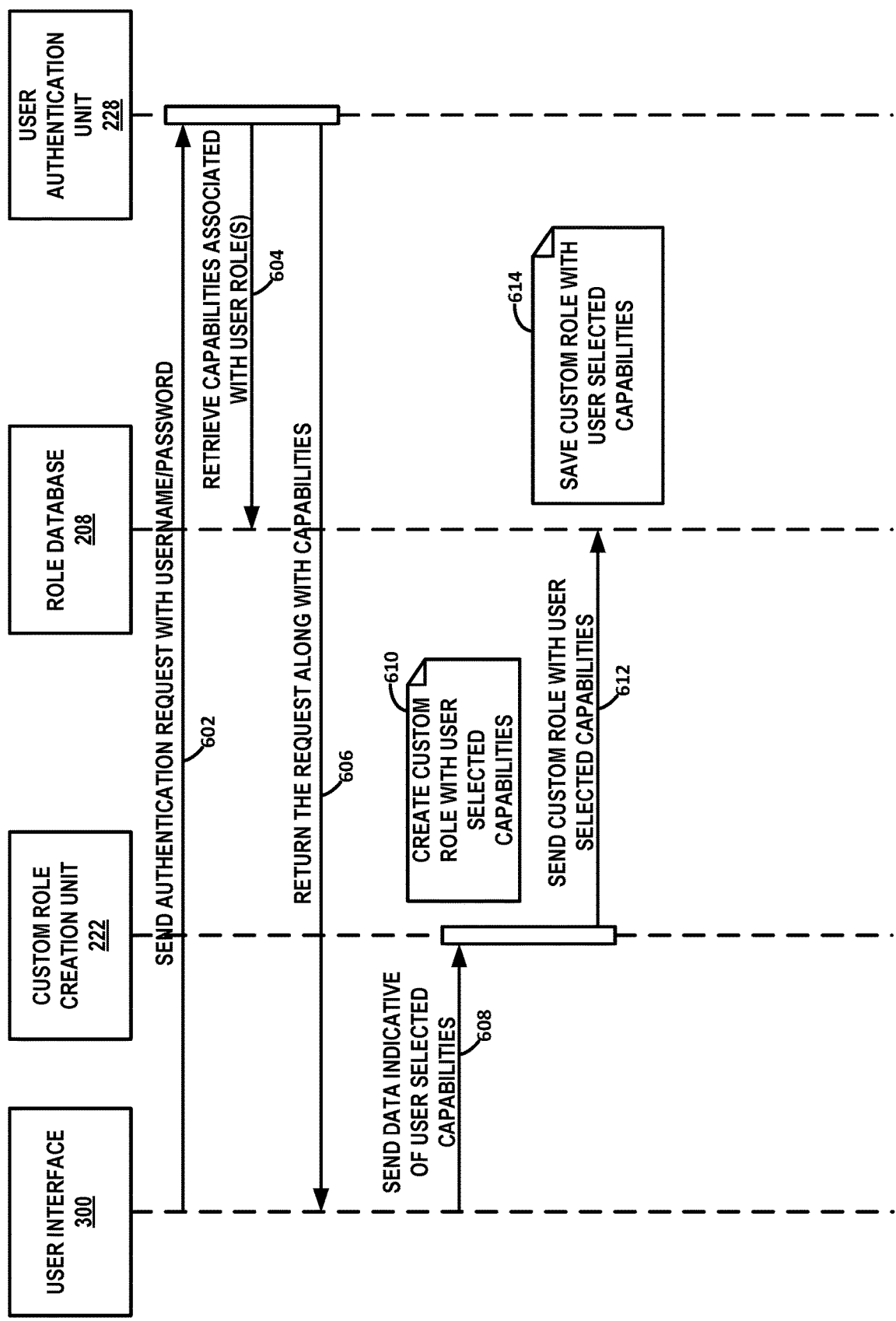
FIG. 6 is a flow diagram illustrating example creation of a custom role based an input to a user interface, in accordance with one or more techniques described herein.

FIG. 6 is a flow diagram illustrating example creation of a custom role based on an input to user interface 30, in accordance with one or more techniques described herein. For purposes of example, the operations are described with respect to components of controller 200 and user interface 300 of FIGS. 2-3. In some examples, user interface 300 detects input corresponding to a user (e.g, a user of tenants 16 or a service provider user) seeking to log in or authenticate. For example, user interface 300 may receive an entry including a username and password, biometric identification, provide voice identification, a completely automated public Turing test to tell computers and humans apart (CAPTCHA), or any combination of such techniques or any other technique now known or hereinafter developed. After the user logs in, user interface 300 may identify at least one role associated with the user. User interface 300 sends a an authentication request including the at least one role associated with the user to user authentication unit 228 of controller 200 (602). In some examples, the authentication request includes a role identifier for each role associated with the user. Although the authentication request identifies one or more roles associated with the user, the token might not include the capabilities associated with the role(s).

After receiving the authentication request from user interface 300, user authentication unit 228 may be configured to retrieve capabilities associated with the at least one role associated with the user (604) from role database 208. Role database 208 includes pre-defined roles 210 and custom roles 212, and data indicative of capabilities that are associated with each of pre-defined roles 210 and custom roles 212. In this manner, based on the role identifiers included with the authentication request sent by user interface 300, user authentication unit 228 may look-up the capabilities associated with the roles given by the role identifiers. User authentication unit 228 returns the authentication request along with the capabilities associated with the roles corresponding to the user (606) to user interface 300. The capabilities may represent a plurality of capabilities that user interface 300 may display on a screen, such as the screen of input interfaces 306. Since capabilities may correspond to actions and privileges within service provider network 2, the plurality of capabilities may represent an exhaustive list of the actions and privileges available to the user within service provider network 2.

When enabling a particular user, such as a first service provider user, to create custom roles, it may be beneficial to limit the capabilities in which a user may select to be associated with a custom role. For example, if the first service provider user logs in to create custom roles, it may be beneficial to limit the capabilities available for custom role creation to the capabilities associated with roles that are assigned to the first service provider user. In this way, by sending the authentication request and retrieving the capabilities associated with the user roles from role database 208, the capabilities available for the first service provider user to select for custom role generation may be limited to the capabilities actually available to the first service provider user themselves. In some examples, a second service provider user may log in to user interface 300, the second service provider user having a greater level of access to service provider network 2 than the first service provider user. For example, every role that is assigned to the first service provider user may be assigned to the second service provider user and additional roles may be assigned to the second service provider user that are not assigned to the first service provider user. As such, a number of capabilities available for the second service provider user to create custom roles than a number of capabilities available for the first service provider user to create custom roles.

To initiate the creation of a custom role, user interface 300 sends data indicative of a set of user-selected capabilities to custom role creation unit 222 of controller 200 (608). In turn, custom role creation unit 222 may create the custom role having the set of user-selected capabilities (610). Custom role creation unit 222 sends the custom role with the user-selected capabilities to role database 208 (612), and controller 200 saves the custom role with the user selected capabilities in role database 208 as a part of custom roles 212 (614).

Although FIG. 6 is described with respect to creating a new custom role, the techniques of FIG. 6 may, in some cases, also be applied to modify existing roles stored in role database 208. For example, after a user logs in, user authentication unit 228 may output a plurality of capabilities reflecting the capabilities associated with roles assigned to the user. Role modification unit 224 may receive data indicative of a role modification from the user, and role modification unit 224 may modify the respective role within role database 208.

Figure 7:
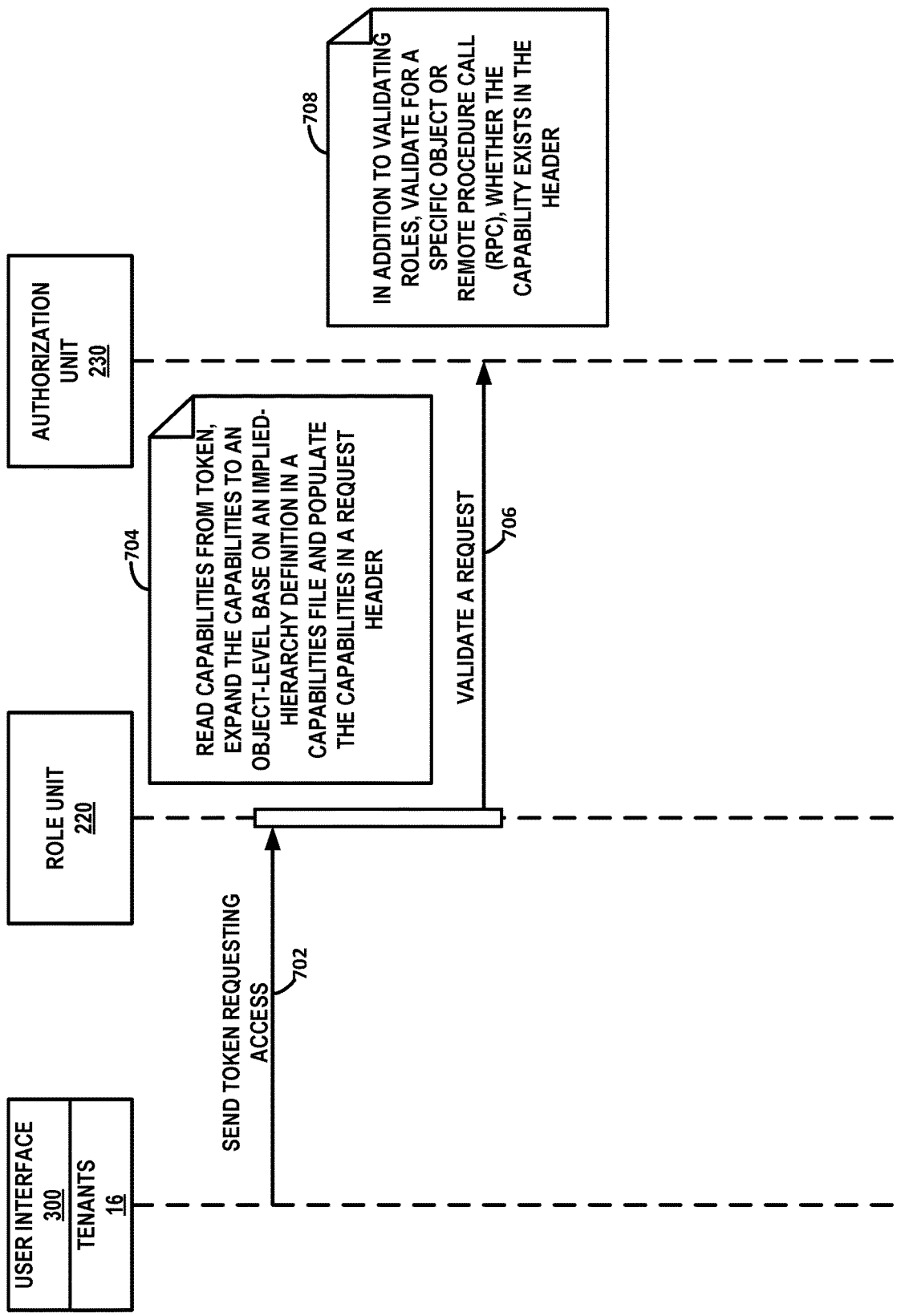
FIG. 7 is a flow diagram illustrating authorization of a user within a service provider network, in accordance with one or more techniques described herein.

FIG. 7 is a flow diagram illustrating authorization of a user (e.g., a user of tenants 16 or a service provider user) within service provider network 2, in accordance with one or more techniques described herein. For purposes of example, the operations are described with respect to components of tenants 16, controller 200 and user interface 300 of FIGS. 1-3. Any combination of user interface 300 and tenants 16 send a token requesting access to objects (e.g., services, APIs, containers, or pods) (702) of service provider network 2. In some examples, a user logs into service provider network 2 via a tenant (e.g., tenant 16A) and provides a user input to a tenant portal of tenant 16A causing tenant 16A to send the token. In other examples, an service provider user logs into user interface 300 and provides a user input to an administrative portal (e.g., input interfaces 306) causing user interface 300 to send the token. In some examples, the token includes information indicative of the user's assigned roles and respective capabilities.

Role unit 220 reads the capabilities from the token, expands the capabilities to an object-level base on an implied-hierarchy definition in a capabilities file, and populates the capabilities in a request header (704). In some examples, to read the capabilities from the token, role unit 220 parses the token to determine the capabilities and the respective hierarchy. In other examples, to read the capabilities from the token, role unit 220 determines the roles from the token and retrieves the capabilities associated with the roles from role database 208. The request header may be a portion of a request prepared by role unit 220 to organize the capabilities and roles corresponding to a particular user such that controller 200 is able to discern the access and privileges available to a particular user and evaluate whether the request may be granted or denied.

Role unit 220 may send the request to authorization unit 230 to validate the request (706). Authorization unit 230, in addition to validating the roles from the request header, validates whether the user may access a specific object or a specific remote procedure call (RPC) based on whether a respective capability exists in the request header (708). In this way, authorization unit 230 provides granular authorization of users within service provider network 2 by granting and denying access to specific objects and RPCs based on the assignment of roles to the user, and the association of capabilities with the roles assigned to the user.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium including instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may include a computer data storage medium such as RAM, read-only memory (ROM), non-volatile random access memory (NVRAM), EEPROM, Flash memory, magnetic or optical data storage media, and the like. In some examples, an article of manufacture may include one or more computer-readable storage media.

In some examples, the computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A controller having access to a network, wherein the controller comprises:
   a storage device; and
   one or more processors in communication with the storage device, wherein the one or more processors are configured to:
   output, to a user interface, data indicative of a plurality of objects for presentation by the user interface, wherein the user interface is configured for user selection of, for each object, a viewing capability, a creation capability, and an editing capability;
   receive, from the user interface, data indicative of a selection of a first set of capabilities and a first role identifier for a first role, wherein the first role identifier corresponds to the first set of capabilities, wherein the first set of capabilities includes network security capabilities and object deployment capabilities;
   create, based on the data indicative of the selection of the first set of capabilities and the first role identifier, the first role, wherein the first role enables performance of a first set of actions within the network, the first set of actions corresponding to the first set of cap abilities from the selection, and wherein the first role and the first set of capabilities define a first subscription level in a multi-level subscription program, wherein a second role e enables performance of a second set of actions within the network, the second set of actions corresponding to a second set of capabilities, and wherein the second role and the second set of capabilities define a second subscription level in the multi-level subscription program, where the second subscription level represents a different class of service than the first subscription level, and wherein:
   the first set of actions includes one or more actions that are not present in the second set of actions; or
   the second set of actions includes one or more actions that are not present in the first set of actions; and
   associate the first role with a user, enabling the user to perform the first set of actions.

2. The controller of claim 1, wherein to output the data indicative of the plurality of objects, the controller is further configured to:
   output data enabling the user interface to display the plurality of objects in a list.

3. The controller of claim 1, wherein the one or more processors are further configured to:
   receive, from the user interface, data indicative of a modification of the first role;
   modify the first role based on the data indicative of the modification by performing at least one of:
   adding at least one capability to the first set of capabilities associated with the first role, and
   removing at least one capability of the first set of capabilities associated with the first role; and
   output data indicative of the modification.

4. The controller of claim 1, wherein the controller is further configured to:
   receive a token specifying a set of roles, wherein the set of roles is associated with the user; and
   retrieve the plurality of objects, wherein the plurality of objects is associated with the set of roles, and wherein the plurality of objects represents the plurality of objects for presentation by the user interface.

5. The controller of claim 1, wherein the one or more processors are further configured to:
   output data indicative of the first role to a role data store, wherein the role data store includes a group of roles including a set of pre-defined roles and a set of user-created roles, and wherein the first role represents a user-created role of the set of user-created roles.

6. The controller of claim 1, wherein before associating the first role with the user, the one or more processors are further configured to:
   receive, from the user interface, data indicative of instructions to associate the first role with the user corresponding to a tenant of a plurality of tenants.

7. The controller of claim 1, wherein the first set of capabilities includes network configuration capabilities and network policy capabilities.

8. The controller of claim 4, wherein the one or more processors are further configured to:
   receive, from the user interface, data indicative of a selection of the second set of capabilities and a selection of a second role identifier, wherein the second role identifier corresponds to the second set of capabilities; and
   create, based on the second set of capabilities and the second role identifier, the second role which enables performance of the second set of actions within the network, the second set of actions corresponding to the second set of capabilities.

9. The controller of claim 6, wherein the one or more processors are further configured to:
   receive a token specifying a set of roles, wherein the set of roles is associated with the user; and
   retrieve, from a role data store, a plurality of capabilities, wherein the plurality of capabilities is associated with the set of roles, and wherein the plurality of capabilities represents the first set of capabilities for presentation by the user interface.

10. A method comprising:
outputting, by one or more processors of a controller and to a user interface, data indicative of a plurality of objects for presentation by the user interface, wherein the user interface is configured for user selection of, for each object, a viewing capability, a creation capability, and an editing capability;
receiving, by the one or more processors and from the user interface, data indicative of a selection of a first set of capabilities and a first role identifier for a first role, wherein the first role identifier corresponds to the first set of capabilities, wherein the first set of capabilities includes network security capabilities and object deployment capabilities;
creating, by the one or more processors and based on the data indicative of the selection of a first set of capabilities and the first role identifier, the first role, wherein the one or more processors are in communication with a storage device, wherein the first role enables performance of a first set of actions within a network, the first set of actions corresponding to the first set of capabilities from the selection, and wherein the first role and the first set of capabilities define a first subscription level in a multi-level subscription program, wherein a second role enables performance of a second set of actions within the network, the second set of actions corresponding to a second set of capabilities, and wherein the second role and the second set of capabilities define a second subscription level in the multi-level subscription program, where the second subscription level represents a different class of service than the first subscription level, and wherein:
the first set of actions includes one or more actions that are not present in the second set of actions; or
the second set of actions includes one or more actions that are not present in the first set of actions; and
associating, by the one or more processors, the first role with a user, enabling the user to perform the first set of actions.

11. The method of claim 10, wherein outputting the data indicative of the plurality of objects comprises:
outputting data enabling the user interface to display the plurality of objects in a list.

12. The method of claim 10, further comprising:
receiving, by the one or more processors and from the user interface, data indicative of a modification of the first role;
modifying, by the one or more processors, the first role based on the data indicative of the modification by performing at least one of:
adding at least one capability to the first set of capabilities associated with the first role; and
removing at least one capability of the first set of capabilities associated with the first role; and
outputting, by the one or more processors, data indicative of the modification.

13. The method of claim 10, further comprising:
receiving, by the one or more processors, a token specifying a set of roles, wherein the set of roles is associated with the user; and
retrieving, by the one or more processors, the plurality of objects, wherein the plurality of objects is associated with the set of roles, and wherein the plurality of objects represents the plurality of objects for presentation by the user interface.

14. The method of claim 10, further comprising:
outputting, by the one or more processors, data indicative of the first role to a role data store, wherein the role data store includes a group of roles including a set of pre-defined roles and a set of user-created roles, and wherein the first role represents a user-created role of the set of user-created roles.

15. The method of claim 13, further comprising:
receiving, by the one or more processors from the user interface, data indicative of a selection of the second set of capabilities and a selection of a second role identifier, wherein the second role identifier corresponds to the second set of capabilities; and
creating, by the one or more processors based on the second set of capabilities and the second role identifier, the second role which performance of to the second set of actions within the network, the second set of actions corresponding to the second set of capabilities.

16. Non-transitory computer-readable media comprising instructions for causing one or more processors to:
output, to a user interface, data indicative of a plurality of objects for presentation by the user interface, wherein the user interface is configured for user selection of, for each object, a viewing capability, a creation capability, and an editing capability;
receive, from the user interface, data indicative of a selection of a first set of capabilities and a first role identifier for a first role, wherein the first role identifier corresponds to the first set of capabilities, wherein the first set of capabilities includes network security capabilities and object deployment capabilities;
create, based on the data indicative of the selection of the first set of capabilities and the first role identifier, the first role, wherein the one or more processors are in communication with a storage device, wherein the first role enables performance of a first set of actions within a network, the first set of actions corresponding to the first set of capabilities from the selection, and wherein the first role and the first set of capabilities define a first subscription level in a multi-level subscription program, wherein a second role enables performance of a second set of actions within the network, the second set of actions corresponding to a second set of capabilities, and wherein the second role and the second set of capabilities define a second subscription level in the multi-level subscription program, where the second subscription level represents a different class of service than the first subscription level, and wherein:
the first set of actions includes one or more actions that are not present in the second set of actions; or
the second set of actions includes one or more actions that are not present in the first set of actions; and
associate the first role with a user, enabling the user to perform the first set of actions.

* * * * *